(12) United States Patent
Brien et al.

(10) Patent No.: US 6,341,996 B1
(45) Date of Patent: Jan. 29, 2002

(54) TOOL GRINDING SIMULATION SYSTEM

(75) Inventors: Glenn C. Brien, Berwick; Nigel T. Stewart, Blackburn South; Mikhail Simakov, Murrumbeena, all of (AU)

(73) Assignee: Anca Pty LTD, Bayswater (AU)

( * ) Notice: Subject to any disclaimer, the term of this patent is extended or adjusted under 35 U.S.C. 154(b) by 0 days.

(21) Appl. No.: 09/242,888

(22) PCT Filed: Sep. 1, 1997

(86) PCT No.: PCT/AU97/00565

§ 371 Date: Oct. 27, 1999

§ 102(e) Date: Oct. 27, 1999

(87) PCT Pub. No.: WO98/09203

PCT Pub. Date: Mar. 5, 1998

(30) Foreign Application Priority Data

Aug. 30, 1996 (AU) .............................................. PO2065

(51) Int. Cl.[7] .............................................. B24B 49/00
(52) U.S. Cl. .............................. 451/8; 451/9; 451/10; 451/5
(58) Field of Search .............................. 451/8, 9, 10, 5

(56) References Cited

U.S. PATENT DOCUMENTS

| 4,757,461 A | * | 7/1988 | Stohr et al. | 451/5 |
| 5,354,414 A | * | 10/1994 | Feygin | 451/5 |
| 5,561,747 A | * | 10/1996 | Crocker et al. | 451/5 |
| 5,741,171 A | * | 4/1998 | Sarfaty et al. | 451/6 |

FOREIGN PATENT DOCUMENTS

| EP | 153556 | 9/1985 |
| EP | 530364 | 3/1993 |
| JP | 08-115117 | 7/1996 |

* cited by examiner

Primary Examiner—Joseph J. Hail, III
Assistant Examiner—Lee Wilson
(74) Attorney, Agent, or Firm—Andrus, Sceales, Starke & Sawall, LLP (57) ABSTRACT

A simulation system (20) for a CNC machine tool includes a swept surface calculation engine (21) for processing workpiece data and grinding wheel data representing information about the grinding wheel (12) and its programmed path to generate a set of geometric envelopes representing the solid volume occupied by the grinding wheel (12) as it moves along its programmed path. The envelopes, workpiece data and grinding wheel data are processed by a 3-D rendering engine (22) to produce a three-dimensional perspective image of the workpiece (11) as it would appear after being ground by the grinding wheel (12). The simulation system (20) also includes a manipulation and control interface 923) which may be used for a wide variety of purposes to enhance the three-dimensional image, such as position, orientation and zoom control, control of simulated illuminated light sources, control of texture maps and color maps and overlay grids which may be superimposed on the surface of the simulated workpiece image.

42 Claims, 8 Drawing Sheets

TOOL GRINDING SIMULATION SYSTEM

INTRODUCTION TO THE INVENTION

This invention relates to computer numerically controlled (CNC) machine tools and in particular to computer generated visual simulation techniques for said machine tools.

BACKGROUND OF THE INVENTION

The development of multi-axis and multi-function machine tools in conjunction with the development of sophisticated computer controlled operation has facilitated the emergence of a generation of very high speed precision machine tools capable of complex multi-step operations from one machine.

Typically a CNC machine is controlled by a computer program, called a "part program", which serially instructs the machine to perform a sequential series of discrete operations in a predetermined sequence so that a movable operative part of the machine tool, such as a milling cutter or grinding wheel, moves along a programmed path determined by the part program. Each individual instruction is termed a "block" and may constitute a determining command for each or a combination of controllable axes. For example, a block may instruct a grinding wheel to move 5 mm in the Y axis at a given velocity or instruct a grinding wheel to rotate and move forward 0.05 mm in the X and Y axes at a given velocity. The blocks, once programmed into the computer, are then fixed in a set sequential order. The whole set of sequential blocks may then be automatically operated by the CNC machine which then operates from start to finish of the part program.

Whilst this definition of a part program describes the traditional means of generating the "programmed path" this invention is equally applicable to other means of generating the programmed paths whether or not they involve the generation or use of a part program. Such techniques may include direct control of the programmed path from within a machine tool programming system or the like. In the context of this invention, programmed path refers to any sequence of data deemed to represent as a minimum, the spatial path that the operative part of the machine tool is programmed to take with respect to the workpiece and "part programme" refers to any program, program file or sequence data which controls or encapsulates this part program.

It is desirable when testing a part program for a complex machine tool to provide a visual simulation of the motion of the operative part of the machine tool and the machining process prior to physically operating the motion of the operative part. This simulation can be performed off-line using suitably configured three-dimensional graphics simulation systems but therein relies on separate computing equipment to that provided by the CNC of the machine tool and corresponding complexity in transferring part programs and simulation data between the CNC and the simulation computer.

For one particular class of machines, the tool and cutter grinder, it is particularly useful to provide an accurate graphical simulation of the machining process. To date this has been difficult because of the inherent geometrical complexity of the tool grinding process. A CNC tool and cutter grinder typically has at least four continuous path axes and is used to manufacture or resharpen spiral fluted cutting tools (the workpiece) such as end-mills, rotary files, drills, reamers and the like. Hereinafter the terms workpiece and cutting tool are used interchangeably. The surface features that are produced on these workpieces are usually generated by complex sweeping motions of the grinding wheel(s) whereby the resultant surface is more geometrically complex than the surface of the grinding wheel. It is therefore difficult to ensure that the desired workpiece shape is produced from the parameters entered into the part program that defines the motions of the grinding wheel of the tool and cutter grinder without the use of three dimensional graphics simulation. Traditional three dimensional simulation tools are not capable of processing the complex data produced by a multi-axis CNC controlled tool and cutter grinder.

It is therefore desirable to provide a computerised simulation environment for tool and cutter grinding machines which provides automated, computerised tools that are based on work practices that are used in manual simulation and verification procedures.

It is also desirable to provide a CNC for complex multi-axis machine tools which can provide three-dimensional, shaded colour graphics simulation of the machining process without the need for an additional simulation computing system.

It is further desirable to provide a calculation system that provides complete mathematical surface descriptions for the purpose of more accurate machine tool path generation in complex multi-axis machine tools.

SUMMARY OF THE INVENTION

According to one aspect of the invention there is provided a simulation system for a computer numerically controlled (CNC) tool grinding machine having at least one movable grinding wheel for operating on a workpiece;

said CNC tool grinding machine being programmed to perform a sequential series of discrete operations in a predetermined sequence to control movement of the grinding wheel along a programmed path;

said CNC machine tool including a grinding machine tool programming system to generate data representing information about the grinding wheel, the workpiece and the programmed path;

wherein the simulation system includes:

processing means for processing the data generated by the machine tool programming system to produce a three-dimensional image of the workpiece as it would appear after operation of the grinding wheel upon the workpiece in accordance with the programmed path;

a visual display unit (VDU) for displaying the three dimensional image; and manipulation and control means for manipulating and controlling the appearance of the three-dimensional image on the visual display unit, the processing means including envelope calculation means which calculates envelope data representing the skin of the solid volume occupied by the grinding wheel during its motion along the programmed path, and the envelope data is subtracted from blank data representing the shape of the workpiece prior to operation of the grinding wheel upon the workpiece to produce swept surface data representing the position and properties of the surface of the workpiece as it would appear during and after operation of the grinding wheel on the workpiece.

Preferably, the processing means is also arranged to produce a three-dimensional image of the grinding wheel for display on the visual display unit. The processing means is preferably arranged to generate perspective views of the workpiece and/or grinding wheel from different viewing directions, and the display of said perspective views is controlled by the manipulation and control means.

The machine tool may be programmed to manufacture a workpiece (e.g. a cutting tool) from a blank workpiece. Alternatively, the machine tool may be programmed to sharpen the edges of an existing workpiece (e.g. a cutting tool). The method of the present invention is particularly applicable to CNC machines in which a grinding wheel is programmed to move with at least four degrees of freedom relative to a workpiece to manufacture or sharpen a spiral fluted cutting tool (the workpiece). Examples of spiral fluted cutting tools which may be manufactured or sharpened by a CNC machine incorporating the invention include: endmills; rotary files; drills; reamers and the like.

The simulation system is preferably incorporated within the CNC machine to form part of the CNC machine. Alternatively, the simulation system may comprise a computer system separate from, but in communication with, the machine tool programming system.

Preferably, the processing means is arranged to generate envelope data representing the outer limits of motion of the grinding wheel by solving the 4, 5 or 6 degree of freedom equations representing the motion of the grinding wheel.

The simulation system preferably includes calculation means programmed to calculate the swept surface data for the workpiece image by Boolean subtraction of the envelope data from the blank data. The surface data corresponds to the position and surface properties of the surface of the workpiece as it would appear during and after being operated upon or "swept" by the grinding wheel.

Preferably, the simulation system includes a three dimensional image rendering engine arranged to produce a three dimensional rendered image of the workpiece and, optionally, of the grinding wheel which can then be displayed on a visual display unit (VDU) of the simulation system.

The simulation system may include overlay means for generating a scaled grid overlay controlled by the manipulation and control means for display on the VDU simultaneously with the three-dimensional image. This is advantageous in that it enables measurements of the workpiece image to be made.

The scaled grid overlay preferably comprises concentric circles and radial lines originating from the center of the circles and said concentric circles are marked with a scale to indicate the radius of each circle as it applies to the scale of the three dimensional image of the workpiece.

The manipulation and control means may also manipulate and control other features of the image displayed on the VDU. The manipulation and control means may be used for a variety of purposes, including the manipulation and control of: the relative size and position of the image on the VDU; simulated light sources for illumination of the image of the workpiece or cutting tool; and/or the appearance of the image.

The simulation system may be used to simulate a machining process of the CNC machine. This is preferably achieved by the system being programmed or controlled to generate animated sequences of images which depict the machining process at successive time intervals by producing three dimensional images of the machined workpiece as it would appear at time intervals during the actual machining process. Accordingly, the manipulation and control means may be used to control the simulation system to display continuous machining operations, individual machining operations, or the completed workpiece only.

The simulation system may include map generating means for generating and displaying a texture map and/or colour map of the surface of the grinding wheel of the machine tool or of the workpiece which map can be superimposed onto the three dimensional rendered image of the grinding wheel or simulated workpiece.

A texture map may consist of fine lines, the density and direction of which may simulate surface scratches which would be produced as a result of the cutting action of the grinding wheel scratching the surface of the workpiece during the machining process.

Alternatively, a colour map may consist of a graduated, colour coded image of the workpiece and/or of the grinding wheel. The simulation system may be arranged to display a colour coded view of the grinding wheel and workpiece wherein the colour of each region of the surface of the workpiece represents a similarly colour coded region of the grinding wheel that would grind the region of the workpiece during the machining process. Alternatively, the simulation system may be arranged to display a colour coded image of the workpiece wherein the colour of each region of the surface of the workpiece represents the scale of the volume of material to be removed per unit of time when the grinding wheel is in contact with the region during the machining process.

A texture map may also consist of one or more curved lines superimposed on the three-dimensional image of the workpiece. The lines may represent instantaneous lines of contact between the machine tool and the workpiece surface at specific times of the machining process. Alternatively, or additionally curved lines may represent lines of constant contact between specific regions of the grinding wheel and the machined surface of the workpiece over the continuum of intervals of the machining process.

According to another aspect of the invention there is provided a CNC tool grinding machine including a simulation system in accordance with the first aspect of the invention and a path controller for controlling movement of the grinding wheel of the CNC tool grinding machine, wherein the swept surface data is transferred to the path controller for adjusting the machining path of the grinding wheel. This enables features of the workpiece (e.g. flutes of a cutting tool) to be machined more accurately during the machining process of the CNC tool grinding machine.

BRIEF DESCRIPTION OF THE DRAWINGS

A preferred embodiment of the present invention will now be described, by way of example only, with reference to the accompanying drawings, in which.

DETAILED DESCRIPTION OF THE PREFERRED EMBODIMENT

Figure 1:
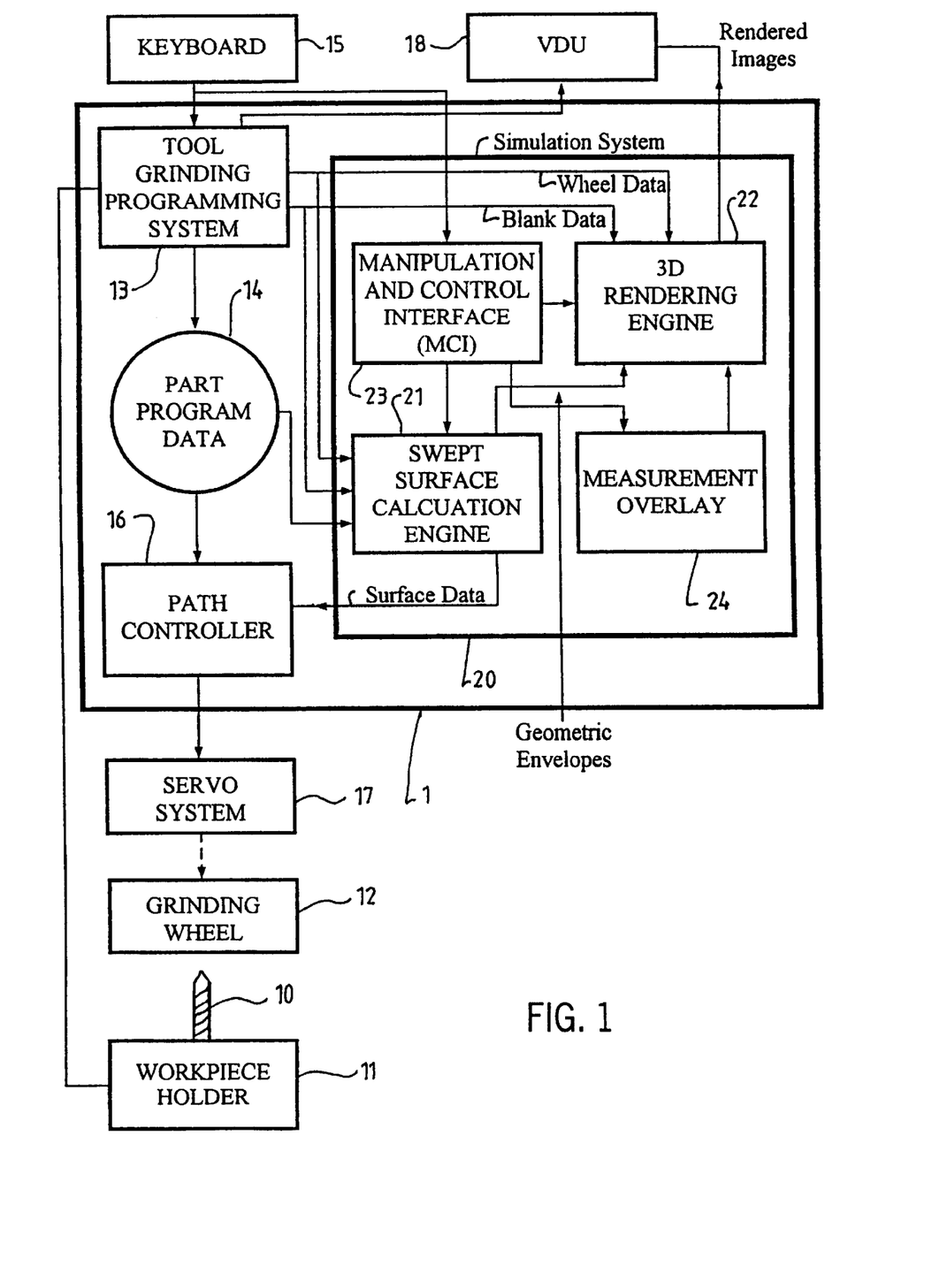
FIG. 1 is a block diagram of a CNC machine incorporating a simulation system in accordance with the invention.

In a preferred embodiment of the invention a CNC machine tool 1 for machining a workpiece 10 includes a workpiece holder 11, a grinding wheel 12 for operating on the workpiece 10 in a machining operation, a tool grinding programming system 13 programmed to generate part program data 14 which serially instructs the machine to perform a series of discrete operations in a predetermined sequence, a keyboard 15 for entering instructions into the programming system 13, a path controller 16 which receives the part program data 14 and a servo system 17 which controls movement of movable parts of the machine under instructions from the path controller 16 to move the machine tool 12 along a programmed path determined by the part program. The CNC machine also includes a simulation system 20 which is arranged to produce simulated images of the workpiece 10 and/or the grinding wheel 12 on display means in the form of a visual display unit (VDU)18. The simulation system 20 is programmed to intercept part program data 14, workpiece data and wheel description data prior to activation within the path controller 16 of the CNC. This intercepted data is channeled to the simulation system 20 which may be resident within the CNC. The simulation system 20 comprises a swept surface calculation engine 21 a three dimensional (3D) rendering engine 22, a manipulation and control interface 23 and a selectable projector or measurement overlay 24.

The simulation system 20 of the CNC intercepts from the programming system 13 machine tool data or "wheel data", which describes the shape of the grinding wheel, workpiece data or "blank data" which describes the shape of the blank (workpiece prior to machining), and data describing the desired parameters of the finished workpiece. It also intercepts part program data 14 representing the programmed or calculated path of the grinding wheel 12 which will be used to grind the workpiece 10. This data is passed to the swept surface calculation engine 21 within the simulation system.

Within the swept surface calculation engine 21, the geometric envelope of the grinding wheel 12 as it is simulated to move through each defined move is calculated. The geometric envelope is defined as the outer surface (or skin) of the volume that is swept by the moving grinding wheel 12. In other words, any blank material that is inside this envelope would be removed during the grinding process and all material that is outside this envelope would be left untouched by the grinding process. The set of the envelopes for all grinding wheel moves defined within a grinding process for a single workpiece defines the complete volume that the grinding wheel 12 will sweep during the complete grinding process.

Figure 2:
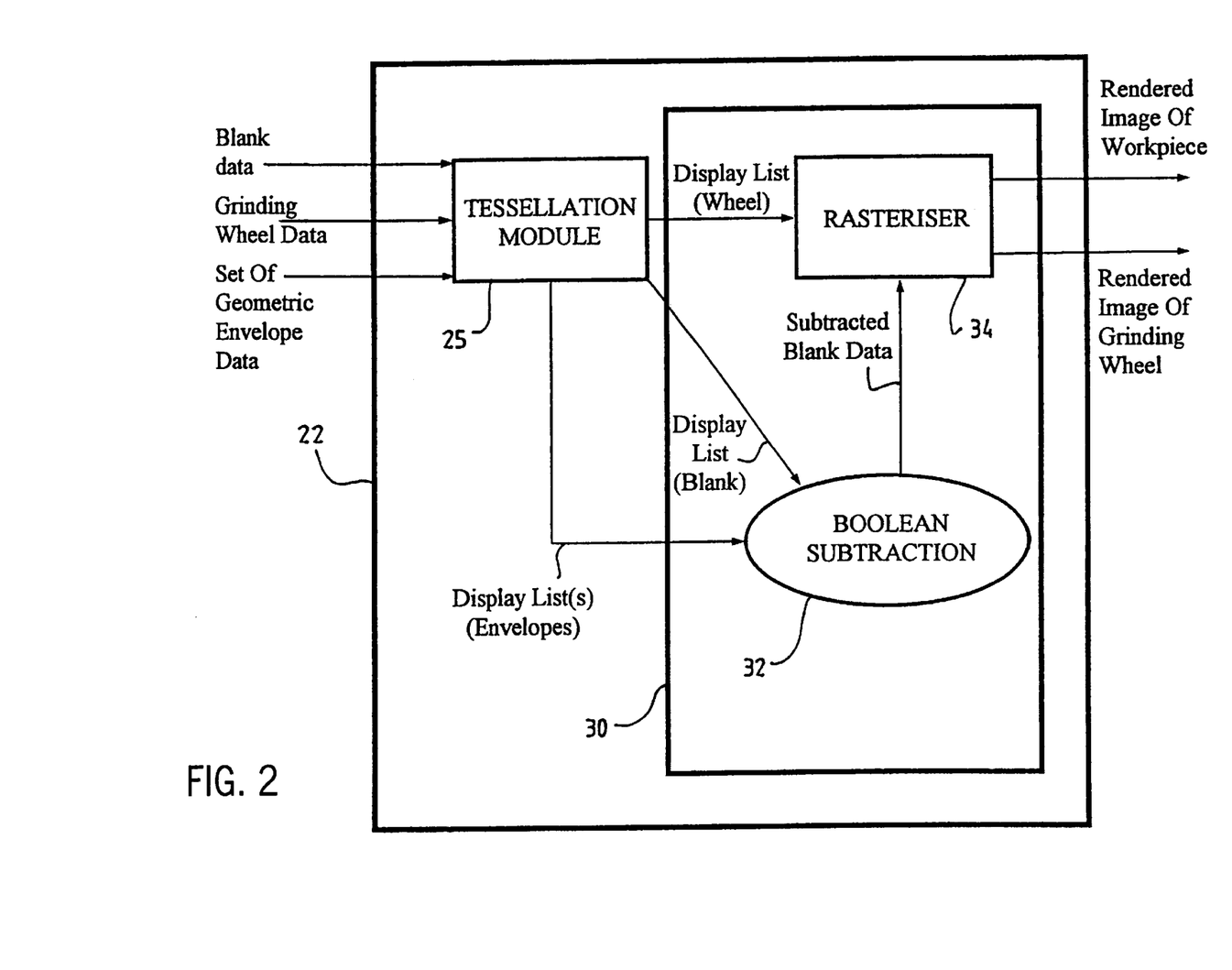
FIG. 2 is a more detailed block diagram of a three dimensional rendering engine of the system of FIG. 1.

The data for the set of geometric envelopes is transferred to the 3D rendering engine 22 along with data for the shape of the blank and data for the grinding wheel. Within the rendering engine 22 (see FIG. 2), a tessellation module 25 performs a tessellation operation on the set of envelopes, the grinding wheel data and blank data to produce display lists comprising polygons which represent the surfaces of the envelopes, blank and grinding wheel. These display lists are then processed by a Constructive Solid Geometry (CSG) module 30 which performs a boolean subtraction 32 and rasterisation 34 of the set of envelopes from the blank to produce a rendered image of the complete surface of the completely simulated workpiece 10 and a rendered image of the grinding wheel 12.

The simulation system 20 can be activated in such a way as to return surface data from the swept surface calculation engine 21 to the path controller 16. In this mode of operation, part program data 14 is also passed to the path controller 16 as well as to the simulation system 20. The surface data is used by the path controller 16 to align machining paths accurately with the generated surfaces.

The three dimensional rendering is performed using three dimensional graphics acceleration facilities of the display hardware and software to produce a smooth shaded, lighted, colour three dimensional image of the completely simulated workpiece on the Visual Display Unit (VDU) 18.

Figure 3:
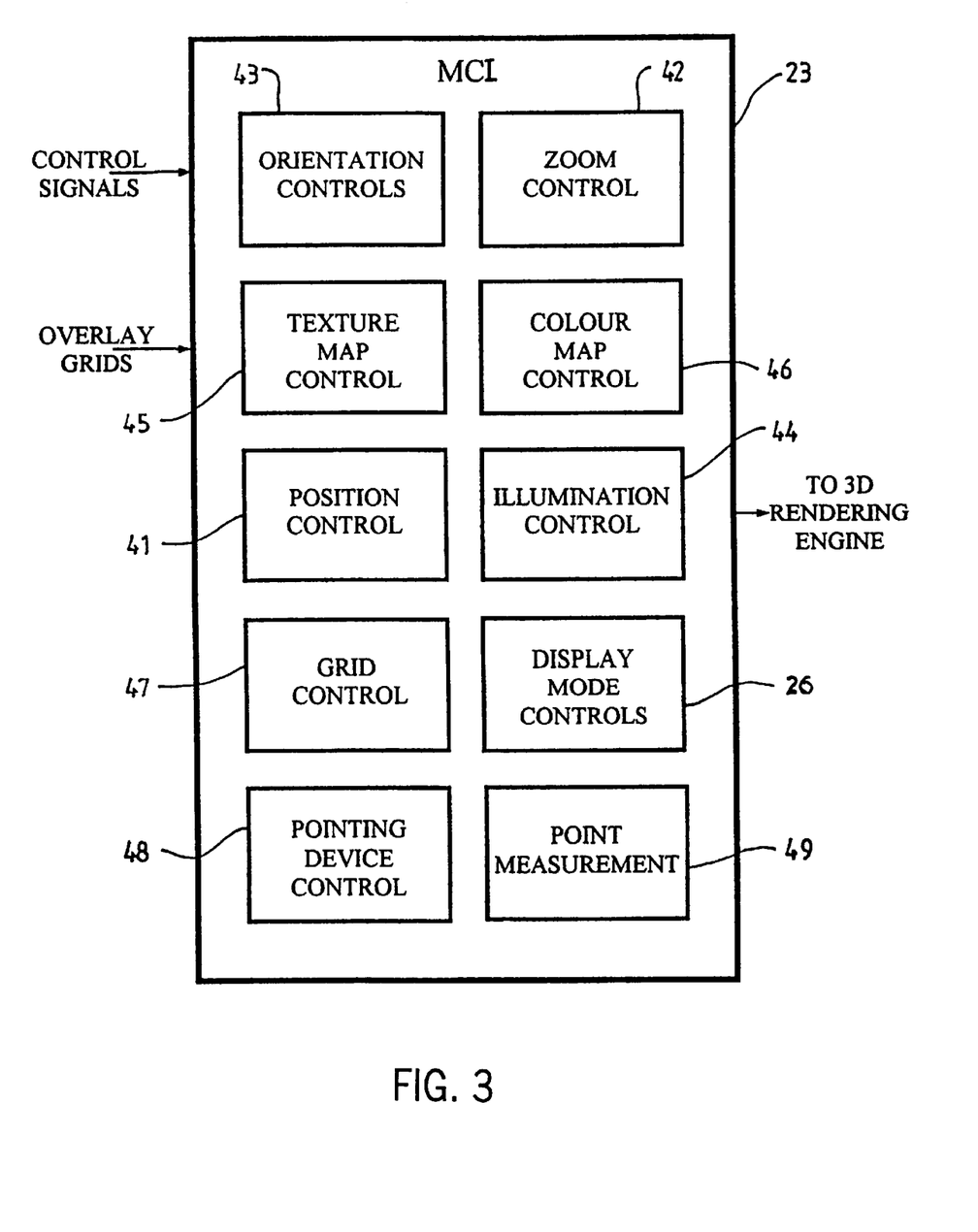
FIG. 3 is a schematic diagram of a manipulation and control interface of the system of FIG. 1.

The Manipulation and Control Interface (MCI) 23 is provided for the machine tool operator to manipulate the appearance of the simulated workpiece on the VDU 18. The MCI 23 provides display mode controls 26 for adjusting the sequence in which the simulation is drawn on the VDU 18. This sequence is controlled by the following modes:

Full grinding mode;

Full operations mode; and

Operation in progress mode.

In Full grinding mode, the image of the simulated workpiece is drawn in its completed (machined) state. In Full operations mode, the image of the workpiece is successively drawn in sequential stages of its simulated grinding process. After each grinding operation (e.g. flute grinding of flute #1, Backoff grinding of flute #4 etc) the image is redrawn showing the workpiece as it would appear at the completion of the actual grinding operation. Using this mode, the operator can see the sequence in which material is removed from the blank during the grinding process to produce the completed workpiece.

In Operation in progress mode, the image is continuously redrawn to show in fine detail, the sequence in which material would be removed from the blank during the grinding process. This mode provides the operator with the most realistic visual feedback of the simulated grinding process.

The MCI 23 may provide other controls for manipulating the operator's view of the simulated workpiece. These controls include a position control 41 for controlling the position of the image on the display screen, a zoom control 42 for zooming of the image, orientation controls 43 for panning and rotation of the image, and an illumination control 44 for moving the location and intensity of simulated light sources.

The swept surface calculation engine 21 may also calculate surface texture and colour maps from the wheel data, blank data and grinding path data passed to it. The MCI 23 is provided with a texture map control 45 and a colour map control 46 for enabling each of the texture and colour maps to be superimposed on the simulation image. The maps may include any one or more of the following:

Surface finish texture map;

Wheel map;

Contact lines map; and

Metal removal rate map.

A surface finish texture map describes the relative surface finish expected at each point on the surface of the completed workpiece. This information is automatically calculated within the swept surface calculation engine 21 by considering the direction of motion of the grinding wheel 12 at each point on each envelope relative to the surface normal to the envelope at each point. The surface finish texture map may comprise fine lines superimposed on the surface of the simulated workpiece depicting the density of surface defects and the directional alignment of the defects where the defects are a natural surface feature of the grinding process and are produced by the scratching action of the grinding wheel grains over the surface of the workpiece as material is removed from the workpiece during the grinding process.

A wheel map is a graduated, colour coded map which is superimposed onto the surface of the simulated workpiece. Each colour represents a particular region of the grinding wheel. The mapping of this colour map onto the surface of the simulated workpiece indicates the region of the grinding wheel which will perform the actual grinding operation for each region of the ground surfaces of the completed workpiece. This information is automatically calculated within the swept surface calculation engine 21 by considering the line of contact between the grinding wheel and the workpiece at each point on the ground surface of the workpiece. The machine tool operator can use this map to predict regions of the grinding wheel that will be subjected to abnormally high heat distributions or wear characteristics due to uneven distribution of grinding loads over the surface of the grinding wheel.

Figure 8:
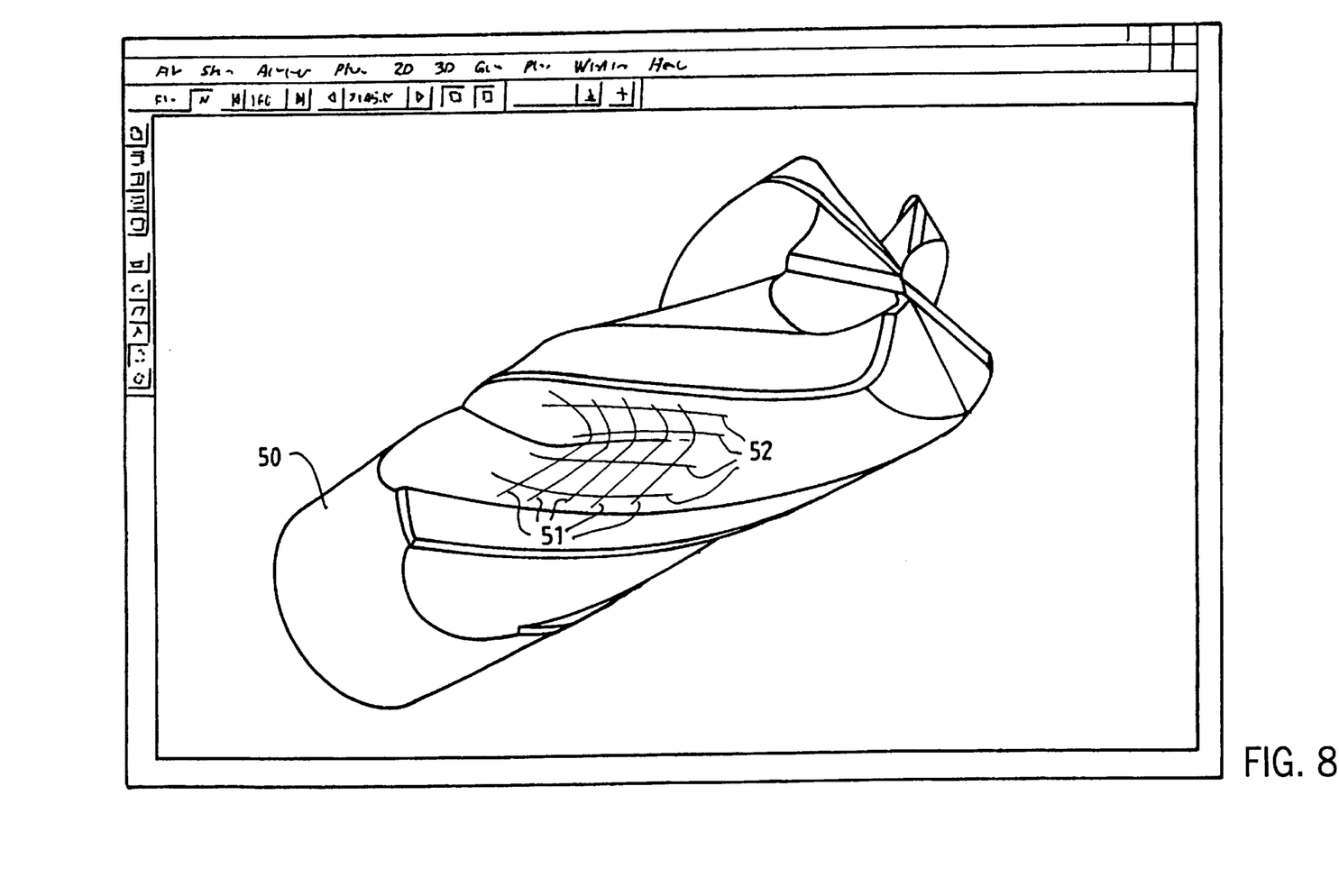
FIG. 8 is a still further view of a display screen including a texture map formed from a grind of curved lines superimposed on the three-dimensioned image of the workpiece.

FIG. 8 shows an example of a contact lines map consisting of a grid of curved lines. The lines 51 in one direction represent instantaneous lines of contact between the grinding wheel and the geometric envelope of the workpiece for successive time sequences during simulated grinding. The lines 52 in the other direction represent lines of contact of specific regions of the grinding wheel over time. This information is automatically calculated within the swept surface calculation engine 21. The machine tool operator can use this map to determine, for any time interval of the grinding sequence, what region of the geometric envelope will be generated by the motion of a particular portion of the grinding wheel.

A metal removal rate map is a graduated, colour coded map which is superimposed onto the surface of the simulated workpiece. Each colour represents a value for the volume of material that will be removed from the blank per unit of time. The mapping of this graduated colour scale onto the surface of the cutting tool image represents the distribution of volumetric metal removal rates over the surface of the cutting tool.

The MCI 23 of the simulation system 20 may provide a further control for the projector overlay 24 which when enabled, generates a scaled measurement grid which can be overlaid or superimposed on the image 50 of the simulated workpiece on the VDU of the CNC. The scaled grid provides immediate visual feedback to the operator of certain dimensional characteristics of the workpiece. A further MCI grid control 47 enables the user to select between available grid patterns. Available grid patters include pre-defined grids and user defined grids. The invention provides for the following pre-defined grids:

Radius/Diameter/Length measurement;

Angle measurement; and

Flute shapes.

Figure 4:
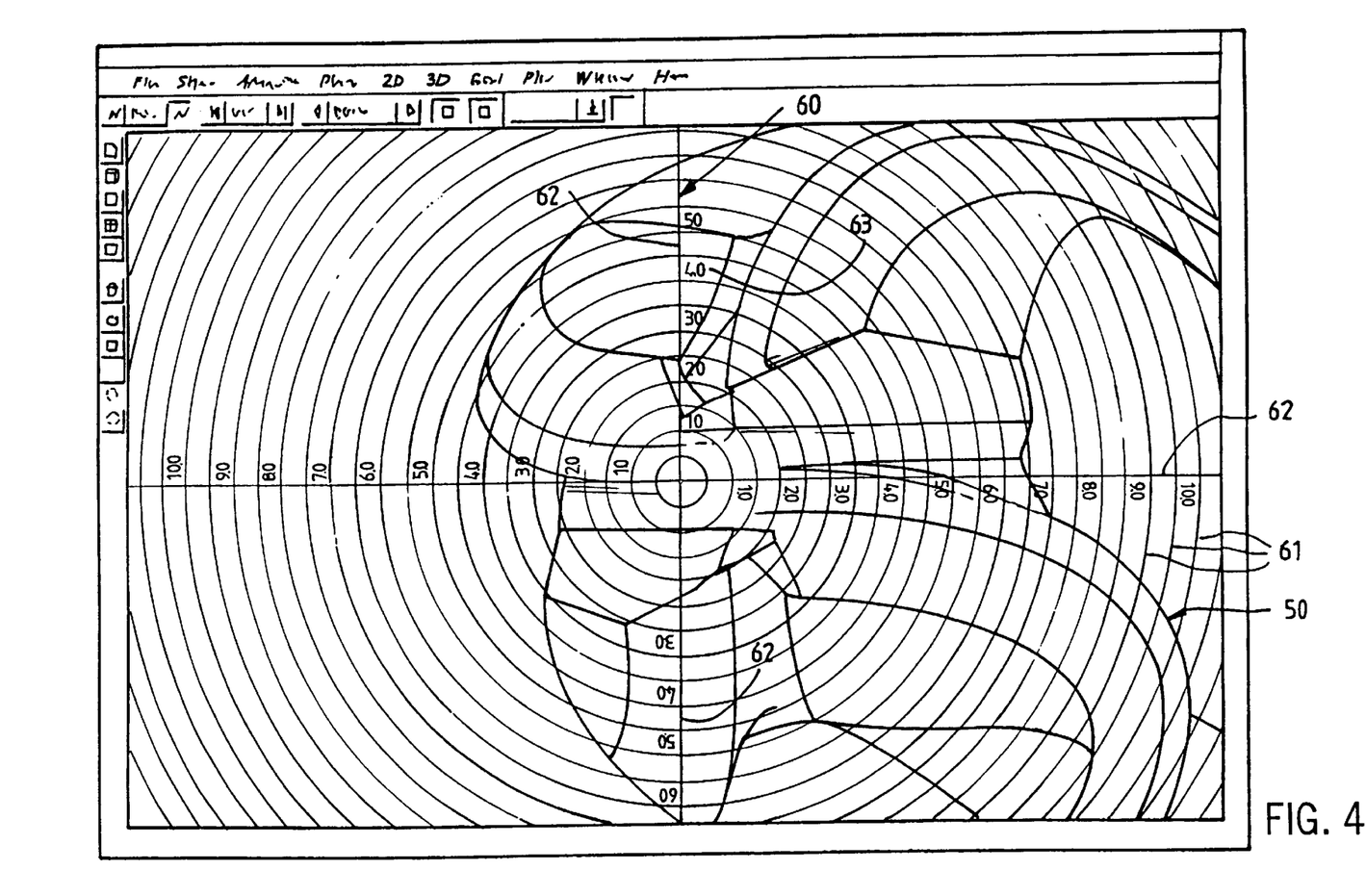
FIG. 4 is a view of a display screen with a scaled grid overlay.
Figure 5:
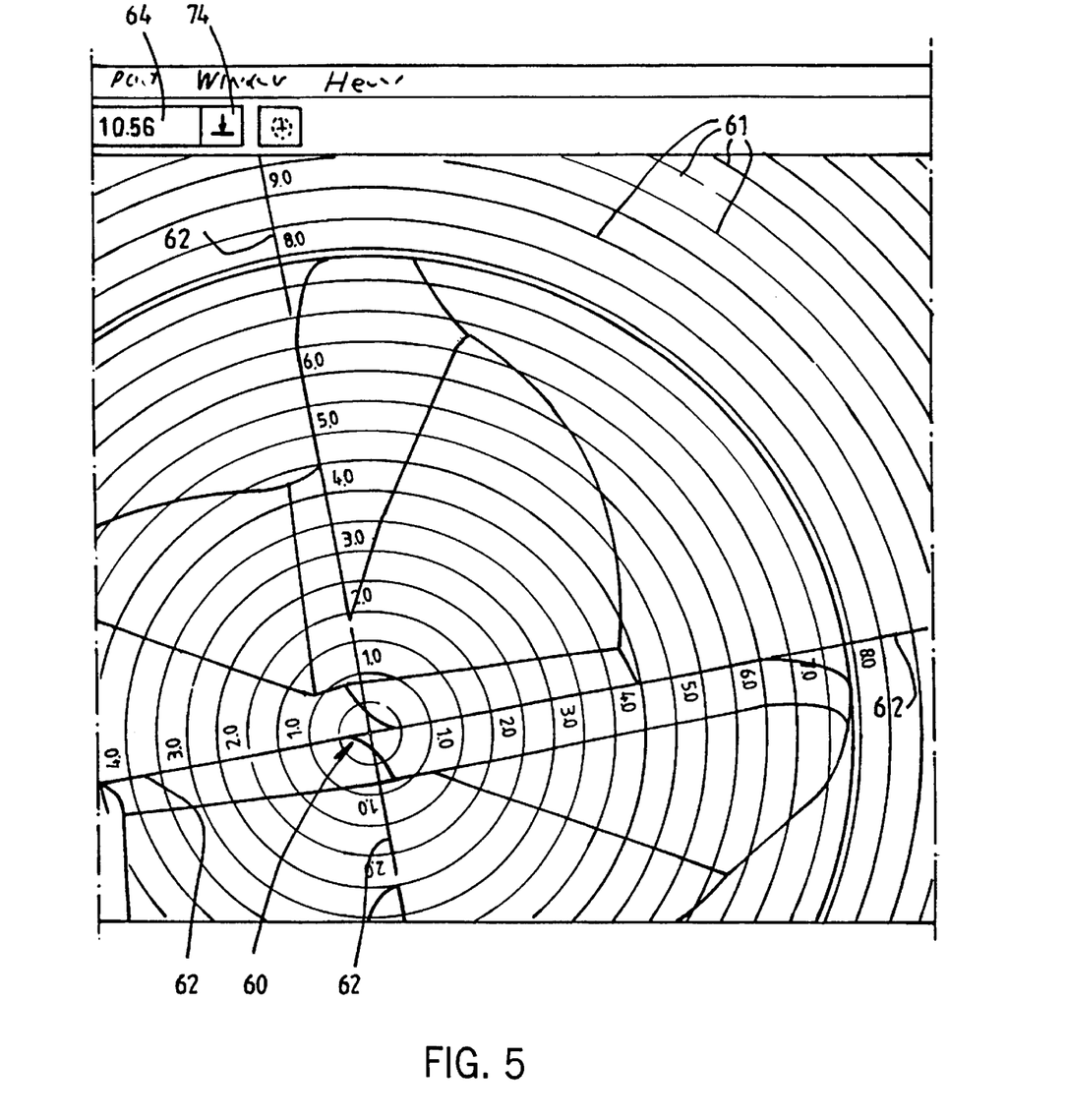
FIG. 5 is another view of a display screen with a scaled grid overlay and including an angular measurement tool.

The Radius/Diameter/Length measurement grid 60 as shown in FIGS. 4 and 5 is a pattern that is designed to be as similar as possible to the grids used on standard manual light projector equipment typically used for measurement verification of cutting tool geometry. It includes a pattern of concentric circles 61 and radial lines 62 originating from the centre of the circles 62 with radius and/or diameter markings 63 in imperial or metric units. The operator uses the position, zoom and orientation controls 41, 42, 43 to position the grid over the top of the feature of interest on the image 50 of the simulated workpiece and then uses the markings 63 on the grid 60 to determine the dimensions of the feature of interest.

Preferably, the grid 60 is automatically adjusted during zooming control of the three-dimensional image of the workpiece so that the scale of the grid remains constant with respect to the scale of the workpiece image as it appears on the VDU. The density of the concentric circles 61 may be automatically adjusted so that the density of the circles lies within a predetermined range. Further, the grid control 47 may include a selection means to adjust the range of allowable values of concentric circle density.

The grid control 47 may also allow the radial lines 62 of the measurement grid to be rotated about the centre of the concentric circles as shown in FIG. 5, with the VDU 18 including angular position display means 64 for displaying the angle of rotation of the grid 60 from a default angular position as shown in FIG. 4 in which the radial lines extend vertically and horizontally on the VDU 18.

The grid control 47 may include zeroing control means 74 for causing the angular position display 64 to read zero, with subsequent angles displayed on the angular position display being angles of the grid relative to the angular position of the grid when the zeroing control was selected.

The Angle measurement grid provides graduated radial lines marked in degrees. The operator uses this grid to measure angular features on the image of the simulated workpiece. The flute shapes grids provide a set of popular cross-sectional shapes for the flutes of cutting tools. These grids can be used by the operator to determine how well the simulated workpiece conforms to the original design specifications for the workpiece. Thus, they provide a means for accurately verifying the grinding process prior to performing the grinding operation.

User defined grids can be any grid pattern or scaled two dimensional drawing which can be drawn with a Computer Aided Design (CAD) package and loaded into the CNC as a data file.

Figure 6:
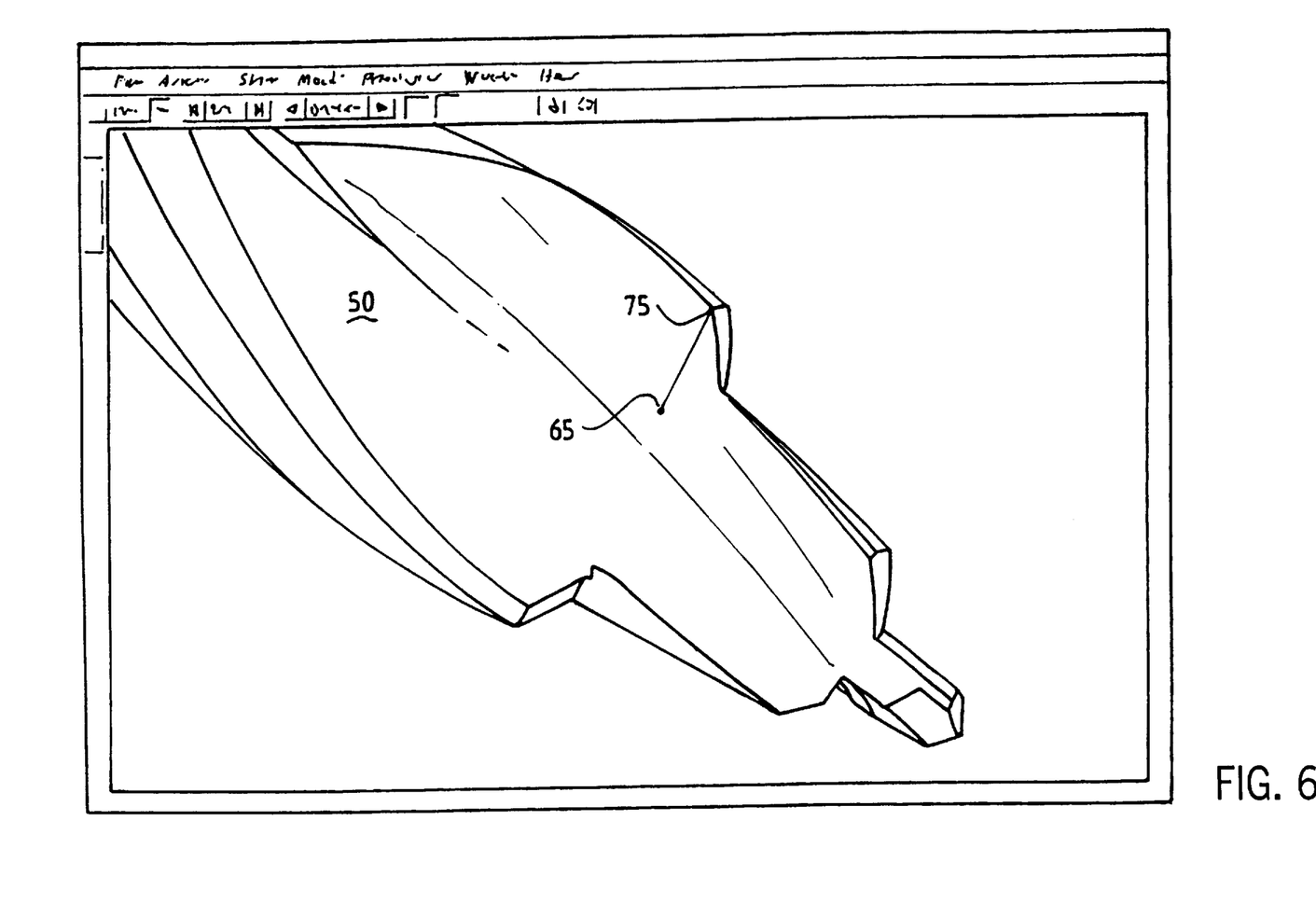
FIG. 6 is a further view of a display screen with a pointing device.
Figure 7:
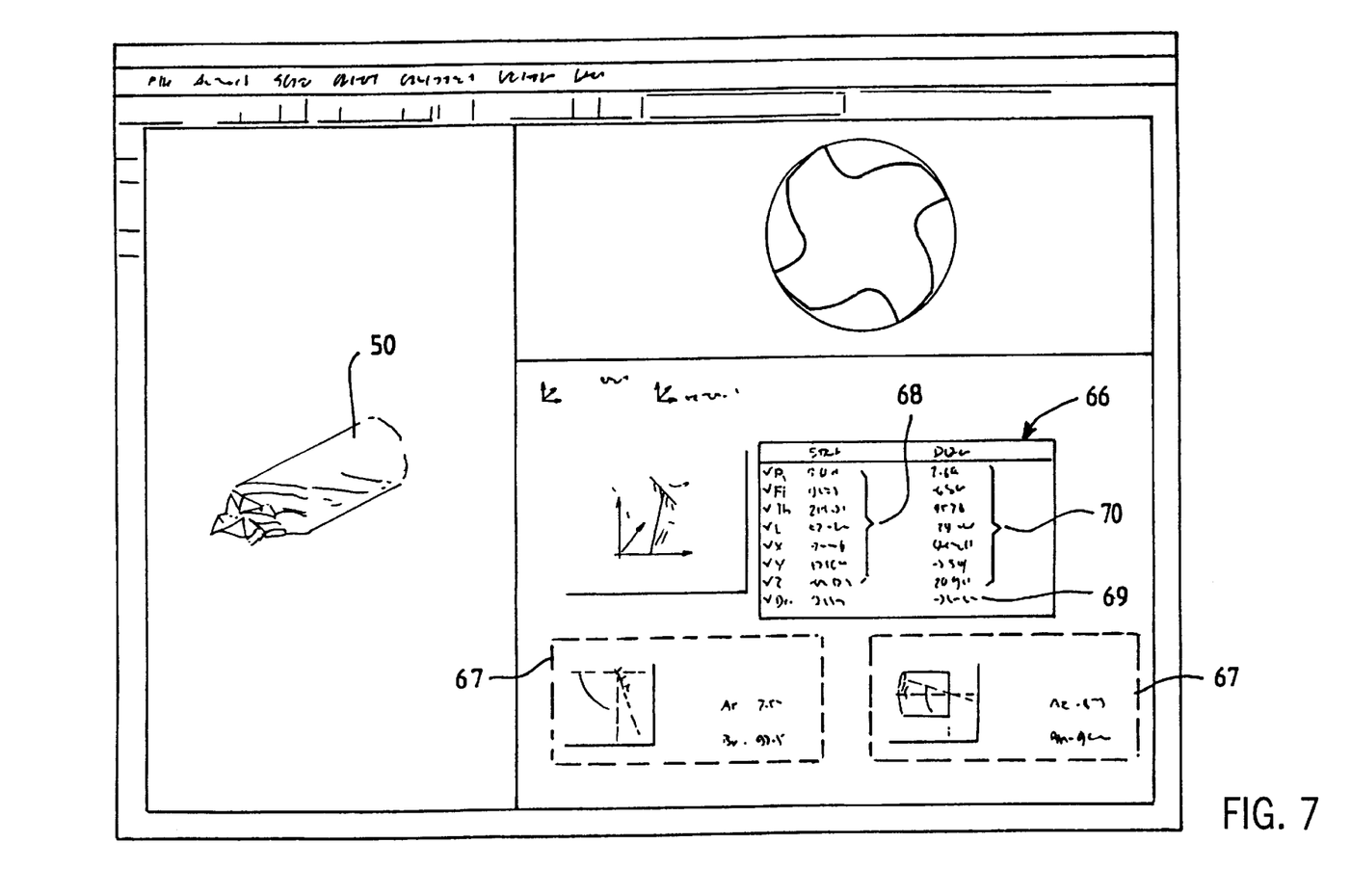
FIG. 7 is yet another view of a display screen with a data display for measurements.

The measurement and control interface (MCI) 23 may also include a pointing device control 48 for selecting one or more points 65, 75 on the surface of the three-dimensional image 50 of the workpiece and measurement means 49 for interrogating the selected points. The VDU may include a measurement display 66 as shown in FIG. 7 for displaying the co-ordinates 68 of a selected point 65 representing the location of the selected point 65 on the surface of the simulated workpiece 50. The measurement display 66 may also display data representing the orientation of the surface of the simulated workpiece 50 at the selected point 65. The VDU may also include an orientation display 67 for displaying the orientation of the surface at the selected surface point as at least one of two components, the first component representing the angle that the surface makes with respect to the radial axis of a cylindrical coordinate system represented by the axes (r,θ,1) embedded in the workpiece wherein said angle is measured in the plane of constant (1) in said cylindrical coordinate system and said radial axis is aligned (in θ) such that said radial axis points toward the selected surface point and the second component representing the angle that the surface makes with respect to said radial axis, measured in the plane of constant θ in said cylindrical coordinate system whereby θ is aligned such that said radial axis points toward the selected surface point.

When a second point 75 is selected by the pointing device control 48, the measurement display 66 may include a "Delta" display for displaying the distance between the first and second selected points as a distance value 59 and/or as the difference in co-ordinates 70 between the two points in the same scale and units as the dimensions of the workpiece.

A new surface orientation may be substituted for the actual workpiece surface orientation at the first selected point for use in the calculation and display of surface orientations, the workpiece surface being transformed into said new surface by rotation about a direction which is perpendicular to both the line connecting the first and second selected points and the surface normal of the workpiece surface at the first selected point, the rotation being sufficient such that the surface tangent of the new surface aligns with the direction of the line between the first selected point and the second selected point.

The MCI 23 may provide a further control, whereby the swept surface calculating engine 21 is controlled to produce mathematical data to describe the geometric envelopes (Surface Data in FIG. 1). In this mode, the path controller can use this data to ensure that generated machine tool paths align perfectly with the swept surface to machine the desired surface features accurately. In tool and other cutter grinding, this feature is particularly useful. Traditionally, the complete mathematical data for the swept surface of the flute of a cutting tool is not known. Using the invention, this data can be precisely calculated. When other features of the tool are around deeply into this swept surface, the accurate positioning of the feature with respect to the swept surface can only be assured if the position of the swept surface is accurately known at all points on the surface. Prior to using this mode of the invention, offset values would normally be entered into the CNC by the operator to adjust for positional errors caused by this lack of data.

The advantages of the invention over traditional techniques of simulation for tool and cutter grinding include:

complete workpiece may be visualised in three dimensions with accurate representation of all surface features;

changes made to the grinding process at the machine operator's console can be immediately simulated and verified; and program verification can be performed on simulated models of the workpiece, using tools that are familiar to users of manual verification procedures; and optionally, simulation can be performed at the machine tool without the use of a separate simulation computer by using the services of the CNC's computer(s);

Workpiece features which intersect swept surfaces can be accurately located.

It will be appreciated that various modifications and alterations may be made to the preferred embodiment without departing from the spirit and scope of the present invention. For instance, a simulation system may be provided in accordance with the invention which is separate from but able to communicate with, a CNC machine to extract data from the CNC machine to produce rendered images of the workpiece and/or machine tool for display on a VDU of the simulation system.

What is claimed is:

1. A tool grinding simulation system for a multi axis computer numerically controlled (CNC) tool grinding machine having at least one movable grinding wheel movable relative to at least four programmable axes for operating on a workpiece;

said CNC tool grinding machine being programmed to perform a sequential series of discrete operations in a predetermined sequence to control movement of the grinding wheel along a programmed path;

said CNC tool grinding machine including a grinding machine tool programming system to generate data representing information about the grinding wheel, the workpiece and the programmed path;

wherein the simulation system includes:

processing means for processing the data generated by the grinding machine tool programming system to produce three-dimensional images of the workpiece as it would appear during and after operating of the grinding wheel upon the workpiece in accordance with the programmed path;

a visual display unit (VDU) for displaying the three-dimensional images; and manipulation and control means for manipulating and controlling the appearance of the three-dimensional images on the visual display unit;

the processing means including calculation means which calculates envelope data representing the skin of the solid volume occupied by the grinding wheel during its motion along the programmed path, the solid volume of the grinding wheel being composed of cylindrical, conical and toroidal surfaces of revolution and combinations thereof, the envelope data being subtracted from blank data representing the shape of the workpiece prior to operation of the grinding wheel upon the workpiece to produce swept surface data representing the position and properties of the surface of the workpiece as it would appear during and after operating of the grinding wheel on the workpiece.

2. A simulation system according to claim 1 wherein the envelope data is subtracted from the blank data by Boolean subtraction.

3. A simulation system according to claim 1 further comprising three dimensional rendering means for producing three-dimensional simulated images of the workpiece and three-dimensional simulated images of the grinding wheel which are displayed on the visual display unit.

4. A simulation system according to claim 1 wherein the processing means is arranged to generate perspective views of the workpiece from different viewing directions, and the display of said perspective views is controlled by the manipulation and control means.

5. A simulation system according to claim 1 further including overlay means for generating a scaled grid overlay, the manipulation and control means controlling the display of the scaled grid overlay on the visual display unit simultaneously with the three-dimensional image of the workpiece.

6. A simulation system according to claim 5 wherein the scaled grid overlay comprises concentric circles and radial lines originating from the center of the circles and said concentric circles are marked with a scale to indicate the radius of each circle as it applies to the scale of the three dimensional image of the workpiece.

7. A simulation system according to claim 6 wherein the scaled grid overlay is automatically adjusted during zooming control of the three-dimensional image of the workpiece such that the scale of the grid remains constant with respect to the scale of the workpiece image as it appears on the VDU.

8. A simulation system according to claim 7 wherein the density of concentric circles on the VDU is automatically adjusted such that the density of circles lies within a predefined range.

9. A simulation system according to claim 8 wherein a selection means is provided to adjust the allowable range of the value of concentric circle density.

10. A simulation system according to claim 6 wherein an angular measurement control means is provided, said means allowing the radial grid lines to be rotated about the center of the concentric circles grid and the angle of rotation of the grid from the default angular position is displayed on the VDU.

11. A simulation system according to claim 10 wherein an angular measurement zeroing control means is provided, whereby selection of such means causes the angular position display to read 0.0 and thereafter, angles displayed on the angular position display are angles of the grid relative to the angular position of the grid when this zeroing control was selected.

12. A simulation system according to claim 1 further including measurement means for interrogating points on the surface of the workpiece, whereby the measurement means is controlled by pointing device means and data is displayed on the VDU relating to the point on the surface of the workpiece which has been selected by the pointing device means.

13. A simulation system according to claim 12 wherein data displayed on the VDU includes the coordinates of the point being interrogated where such coordinates represent the location of the selected point on the surface of the workpiece.

14. A simulation system according to claim 13 wherein data displayed on the VDU includes the orientation of the surface of the workpiece at the selected surface point.

15. A simulation system according to claim 14 wherein the orientation of the surface at the selected surface point is displayed as at least one of two components, the first component representing the angle that the surface makes with respect to the radial axis of a cylindrical coordinate system represented by the axes (r,θ,1) embedded in the workpiece wherein said angle is measured in the plane of constant (1) in said cylindrical coordinate system and said radial axis is aligned (in θ) such that said radial axis points toward the selected surface point and the second component representing the angle that the surface makes with respect to said radial axis, measured in the plane of constant θ in said cylindrical coordinate system whereby θ is aligned such that said radial axis points toward the selected surface point.

16. A simulation system according to claim 14 wherein a second point is selectable on the surface of the workpiece, a new surface orientation is substituted for the actual workpiece surface orientation at the first selected point for use in the calculation and display of surface orientations, and the workpiece surface is transformed into said new surface by rotation about a direction which is perpendicular to both the line connecting the first and second selected points and the surface normal to the workpiece surface at the first selected point, said rotation being sufficient such that the surface tangent of the new surface aligns with the direction of the line between the first selected point and the second selected point.

17. A simulation system according to claim 12 wherein a second point is selectable on the surface of the workpiece, and the distance between the first and second selected points is displayed on the VDU as the distance between the two points in the same scale and units as the dimensions of the workpiece.

18. A simulation system according to claim 12 wherein a second point is selectable on the surface of the workpiece, and the distance between the two points is displayed on the VDU as the difference in coordinates between the two points in the same scale and units as the dimensions of the workpiece.

19. A simulation system according to claim 1 to further including texture generating means for generating a texture map of the surface of the workpiece, the manipulation and control means controlling the display of the texture map on the visual display unit, and the texture map is applied to the surface of the three-dimensional image of the workpiece.

20. A simulation system according to claim 19 wherein the texture map comprises a series of fine lines superimposed on the three dimensional image of the workpiece to simulate surface scratches which would be produced as a result of the cutting action of the grinding wheel scratching the surface of the workpiece during the machining process.

21. A simulation system according to claim 19, wherein the texture map comprises a plurality of curved lines superimposed on the three-dimensional image of the workpiece, each line representing the instantaneous line of contact between the grinding wheel and the machine surface of the workpiece at a specific time of the machining process.

22. A simulation system according to claim 19, wherein the texture map comprises a plurality of curved lines superimposed on the three-dimensional image of the workpiece, each line representing a line of contact between a specific region of the grinding wheel and the machined surface of the workpiece over the continuum of the time intervals of the machining process.

23. A simulation system according to claim 19, wherein the texture map comprises a grid of a plurality of curved lines superimposed on the three-dimensional image of the workpiece, wherein each line in one direction represents the instantaneous line of contact between the grinding wheel and the machined surface of the workpiece at a specific time of the machining process and each line in the other direction represents a line of contact between a specific region of the grinding wheel and the machine surface of the workpiece over the continuum of time intervals of the machining process.

24. A simulation system according to claim 1 further including colour map generating means for generating a colour map of the surface of the workpiece, the manipulation and control means controlling the display of the colour map on the visual display unit, and the colour map is applied to the surface of the three-dimensional image of the workpiece, wherein the colour map comprises a graduated, colour coded image of the workpiece.

25. A simulation system according to claim 24 wherein the system is controlled to display colour coded views of the workpiece and grinding wheel in which the colour of each region of the surface of the workpiece corresponds to a similar colour coded region of the grinding wheel that would operate on the region of the workpiece during the machining process.

26. A simulation system according to claim 24 wherein the system is controlled to display a colour coded image of the workpiece in which the colour of each region of the surface of the workpiece represents the volume of material to be removed per unit of time when the grinding wheel is in contact with the workpiece during the machining process.

27. A simulation system according to claim 1 including simulated illumination means for simulated illumination of the three-dimensional images of the workpiece, the simulated illumination means being controlled by the manipulation and control means.

28. A simulation system according to claim 1 wherein the processing means is arranged to generate animated sequences of three-dimensional images of the workpiece as it would appear at successive time intervals during the machining process.

29. A simulation system according to claim 28 wherein the manipulation and control means allows for selection of any one of the following simulated display modes: continuous machining operations; individual machining operations; and completed workpiece display.

30. A tool grinding simulation system for a computer numerically controlled (CNC) tool grinding machine having at least one movable grinding wheel for operating on a workpiece;

said CNC tool grinding machine being programmed to perform a sequential series of discrete operations in a predetermined sequence to control movement of the grinding wheel along a programmed path;

said CNC tool grinding machine including a grinding machine tool programming system to generate data representing information about the grinding wheel, the workpiece and the programmed path;

wherein the simulation system includes:

processing means for processing the data generated by the grinding machine tool programming system to produce a three-dimensional image of the workpiece as it would appear after operation of the grinding wheel upon the workpiece in accordance with the programmed path;

a visual display unit (VDU) for displaying the three-dimensional image; and manipulation and control means for manipulating and controlling the appearance of the three-dimensional image on the visual display unit;

the processing means including calculation means which calculates envelope data representing the skin of the solid volume occupied by the grinding wheel during its motion along the programmed path, and the envelope data is subtracted from blank data representing the shape of the workpiece prior to operation of the grinding wheel upon the workpiece to produce swept surface data representing the position and properties of the surface of the workpiece as it would appear during and after operation of the grinding wheel on the workpiece;

and further comprising three-dimensional rendering means for producing three-dimensional images of the workpiece and three-dimensional images of the grinding wheel which are displayed on the visual display unit, wherein the three-dimensional rendering means includes a tessellation module for performing tessellation operations on the grinding wheel data, the envelope data and the blank data to produce display lists in the form of polygons representing the surfaces of solid volumes of the grinding wheel and the workpiece.

31. A CNC tool grinding machine comprising:

at least one movable grinding wheel for operating on a workpiece;

a path controller for controlling movement of the grinding wheel relative to the workpiece along a programmed path, a grinding machine tool programming system to generate data representing information about the grinding wheel, the workpiece and the programmed path;

and a simulation system including:

processing means for processing the data generated by the grinding machine tool programming system to produce a three-dimensional image of the workpiece as it would appear after operation of the grinding wheel upon the workpiece in accordance with the programmed path;

the processing means including calculation means which calculates envelope data representing the skin of the solid volume occupied by the grinding wheel during its motion along the programmed path, the envelope data being subtracted from blank data representing the shape of the workpiece prior to operation of the grinding wheel upon the workpiece to produce swept surface data representing the position and properties of the surface of the workpiece as it would appear during and after operation of the grinding wheel on the workpiece, wherein the swept surface data is transferred to the path controller for adjusting the path of the grinding wheel.

32. A tool grinding simulation system for a computer numerically controlled (CNC) tool grinding machine having at least one movable grinding wheel for operating on a workpiece;

said CNC tool grinding machine being programmed to perform a sequential series of discrete operations in a predetermined sequence to control movement of the grinding wheel along a programmed path;

said CNC tool grinding machine including a grinding machine tool programming system to generate data representing information about the grinding wheel, the workpiece and the programmed path;

wherein the simulation system includes:

processing means for processing the data generated by the grinding machine tool programming system to produce a three-dimensional image of the workpiece as it would appear after operation of the grinding wheel upon the workpiece in accordance with the programmed path;

a visual display unit (VDU) for displaying the three-dimensional image; and manipulation and control means for manipulating and controlling the appearance of the three-dimensional image on the visual display unit;

the processing means including calculation means which calculates envelopes data representing the skin of the solid volume occupied by the grinding wheel during its motion along the programmed path, and the envelope data is subtracted from blank data representing the shape of the workpiece prior to operation of the grinding wheel upon the workpiece to produce swept surface data representing the position and properties of the surface of the workpiece as it would appear during and after operation of the grinding wheel on the workpiece, and further including overlay means for generating a scaled grid overlay, the manipulation and control means controlling the display of the scaled grid overlap on the visual display unit simultaneously with the three-dimensional image of the workpiece.

33. A simulation system according to claim 32 wherein the scaled grid overlay comprises concentric circles and radial lines originating from the centre of the circles and said concentric circles are marked with a scale to indicate the radius of each circle as it applies to the scale of the three dimensional image of the workpiece.

34. A simulation system according to claim 33 wherein the scaled grid overlap is automatically adjusted during zooming control of the three-dimensional image of the workpiece such that the scale of the grid remains constant with respect to the scale of the workpiece image as it appears on the VDU.

35. A simulation system according to claim 34 wherein the density of concentric circle on the VDU is automatically adjusted such that the density of circles lies within a pre-defined range.

36. A simulation system according to claim 35 wherein a selection means is provided to adjust the allowable range of the value of concentric circle density.

37. A simulation system according to claim 33 wherein an angular measurement control means is provided, said means allowing the radial grid lines to be rotated about the centre of the concentric circles grid and the angle of rotation of the grid from the default angular position is displayed on the VDU.

38. A simulation system according to claim 37 wherein an angular measurement zeroing control means is provided, whereby selection of such means causes the angular position display to read 0.0 and thereafter, angles displayed on the angular position display are angles of the grid relative to the angular position of the grid when this zeroing control was selected.

39. A tool grinding simulation system for a computer numerically controlled (CNC) tool grinding machine having at least one movable grinding wheel for operating on a workpiece;
   said CNC tool grinding machine being programmed to perform a sequential series of discrete operations in a predetermined sequence to control movement of the grinding wheel along a programmed path;
   said CNC tool grinding machine including a grinding machine tool programming system to generate data representing information about the grinding wheel, the workpiece and the programmed path;
   wherein the simulation system includes:
      processing means for processing the data generated by the grinding machine tool programming system to produce a three-dimensional image of the workpiece as it would appear after operation of the grinding wheel upon the workpiece in accordance with the programmed path;
      a visual display unit (VDU) for displaying the three dimensional image; and manipulation and control means for manipulating and controlling the appearance of the three dimensional image on the visual display unit;
      the processing means including calculation means which calculates envelope data representing the skin of the solid volume occupied by the grinding wheel during its motion along the programmed path, and the envelope data is subtracted from bland data representing the shape of the workpiece prior to operation of the grinding wheel upon the workpiece to produce swept surface data representing the position and properties of the surface of the workpiece as it would appear during and after operation of the grinding wheel on the workpiece,
      further including measurement means for interrogating points on the surface of the workpiece, whereby the measurement means includes pointing device means for selecting points on the surfaces of the workpiece and data is displayed on the VDU relating to the point on the surface of the workpiece which has been selected by the pointing device means, wherein data displayed on the VDU includes the orientation of the surface of the workpiece at the selected surface point, and wherein the orientation of the surface at the selected surface point is displayed as at least one of two components, the first component representing the angle that the surface makes with respect to the radial axis of a cylindrical coordinate system represented by the axes (r,θ,1) embedded in the workpiece wherein said angle is measured in the plane of constant (1) in said cylindrical coordinate system and said radial axis is aligned (in θ) such that said radial axis points toward the selected surface point and the second component representing the angle that the surface makes with respect to said radial axis, measured in the plane of constant θ in said cylindrical coordinate system whereby θ is aligned such that said radial axis points toward the selected surface point.

40. A simulation system according to claim 39 wherein a second point is selectable on the surface of the workpiece, a new surface orientation is substituted for the actual workpiece surface orientation at the first selected point for use in the calculation and display of said surface orientations. and the workpiece surface is transformed into said new surface by rotation about a direction which is perpendicular to both the line connecting the first and second selected points and the surface normal of the workpiece surface at the first selected point, said rotation being sufficient such that the surface tangent of the new surface aligns with the direction of the line between the first selected point and the second selected point.

41. A tool grinding simulation system for a computer numerically controlled (CNC) tool grinding machine having at least one moveable grinding wheel for operating on a workpiece;
   said CNC tool grinding machine being programmed to perform a sequential series of discrete operations in a predetermined sequence to control movement of the grinding wheel along a programmed path;
   said CNC tool grinding machine including a grinding machine tool programming system to generate data representing information about the grinding wheel, the workpiece and the programmed path;
   wherein the simulation system includes:
      processing means for processing the data generated by the grinding machine tool programming system to produce a three-dimensional image of the workpiece as it would appear after operation of the grinding wheel upon the workpiece in accordance with the programmed path;
      a visual display unit (VDU) for displaying the three dimensional image; and manipulation and control means for manipulating and controlling the appearance of the three-dimensional image on the visual display unit;
      the processing means including calculation means which calculates envelope data representing the skin of the sold volume occupied by the grinding wheel during its motion along the programmed path, and the envelope data is subtracted from blank data representing the shape of the workpiece prior to operation of the grinding wheel upon the workpiece to produce swept surface data representing the position and properties of the surface of the workpiece as it would appear during and after operation of the grinding wheel on the workpiece,
      further including measurement means for interrogating points on the surface of the workpiece, whereby the measurement means is controlled by pointing device means and data is displayed on the VDU relating to a first point on the surface of the workpiece which has been selected by the pointing device means, wherein a second point is selectable on the surface of the workpiece and the distance between the first and second points is displayed on the VDU as the distance between the two points in the same scale as the dimensions of the workpiece.

42. A tool grinding machine system for a multi-axis computer numerically controlled (CNC) tool grinding machine having at least one grinding wheel movable relative to at least four programmable axes for operating on a workpiece, the grinding wheel having a relatively large radial dimension relative to the radial dimension of the workpiece;

said CNC tool grinding machine being programmed to perform a sequential series of discrete operations in a predetermined sequence to control movement of the grinding wheel along a programmed path;

said CNC tool grinding machine including a grinding machine tool programming system to generate data representing information about the grinding wheel, the workpiece and the programmed path;

wherein the simulation system includes:

processing means for processing the data generated by the grinding machine tool programming system to produce a simulated three-dimensional image of the workpiece as it would appear after operation of the grinding wheel upon the workpiece in accordance with the programmed path;

a visual display unit (VDU) for displaying the simulated three dimensional image; and manipulation and control means for manipulating and controlling the appearance of the simulated three-dimensional image on the visual display unit;

the processing means including calculation means which calculates envelope data representing the skin of the solid volume occupied by the grinding wheel during its motion along the programmed path, and the envelope data is subtracted from blank data representing the shape of the workpiece prior to operation of the grinding wheel upon the workpiece to produce swept surface data representing the potion and properties of the surface of the workpiece as it would appear during and after operation of the grinding wheel on the workpiece.

* * * * *